UNITED STATES PATENT OFFICE.

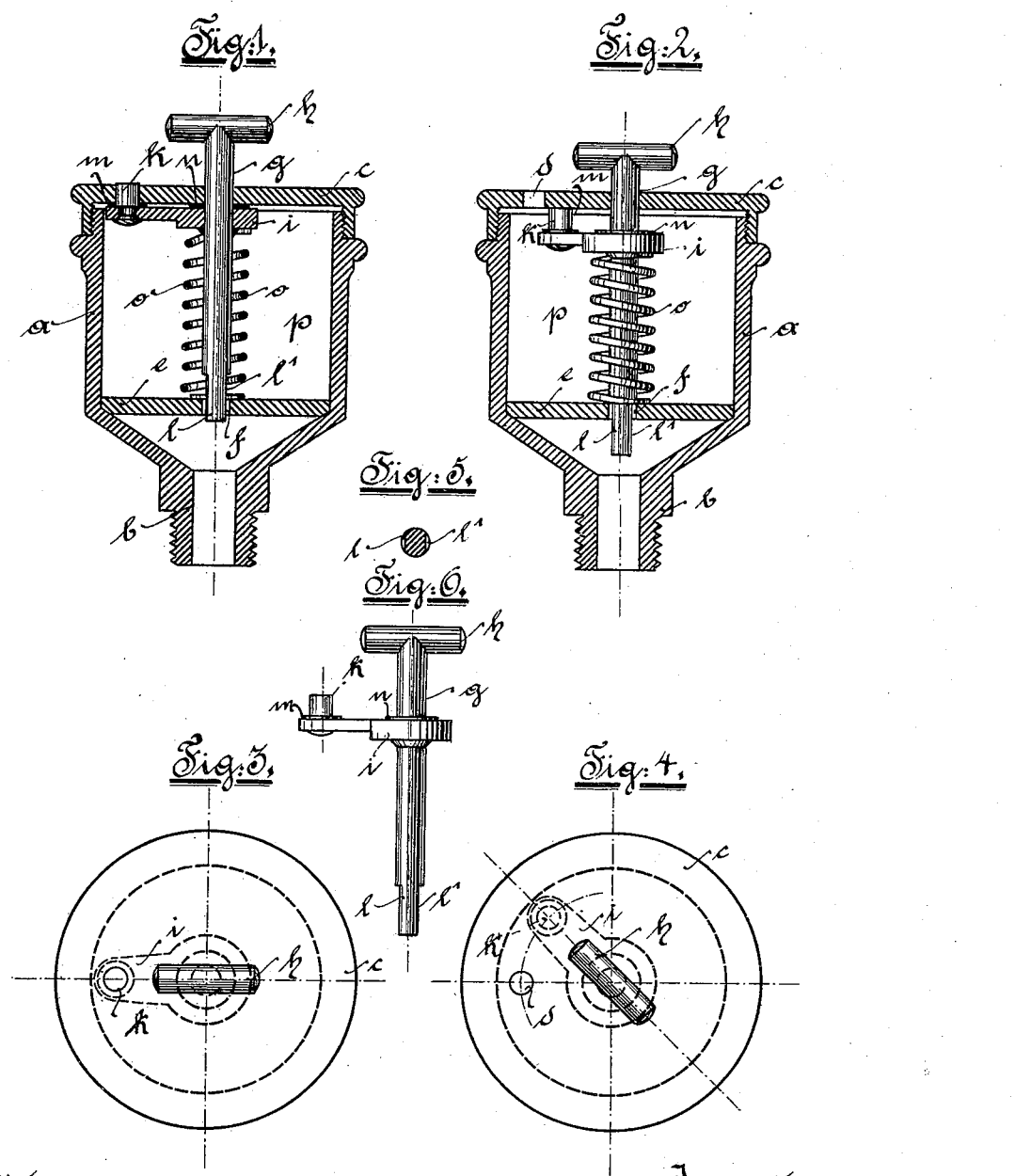

ADALBERT KOSCHADE, OF ERDING, GERMANY, ASSIGNOR TO GEORG BEISSBARTH, VORMALS FR. LOOS, OF NUREMBERG, GERMANY.

LUBRICATOR.

SPECIFICATION forming part of Letters Patent No. 618,470, dated January 31, 1899.

Application filed July 18, 1898. Serial No. 686,233. (No model.)

*To all whom it may concern:*

Be it known that I, ADALBERT KOSCHADE, a resident of Erding, Bavaria, Germany, have invented an Improvement in Lubricators, of which the following is a specification.

The invention relates to lubricators, and has for its object to so arrange a second chamber separate from the lubricating-chamber proper as a reservoir for a larger quantity of liquid lubricant that the discharge of oil therefrom to the lubricating-chamber is greatly impeded in order that when in use the oil may be economized as much as possible.

The invention will be described with reference to the accompanying drawings, in which—

Figures 1 and 2 are vertical sections of the lubricator closed and open, respectively. Figs. 3 and 4 are corresponding plan views, and Figs. 5 and 6 are detail views.

In the example shown in the drawings the second chamber aforesaid, according to Figs. 1 and 2, is formed by the inner chamber $p$ of a box $a$, which is adapted to be attached by means of the screwed extension $b$ to the lubricating-chamber proper and provided near the top with a screw-off cover $c$. The oil-chamber is separated from the lubricating-chamber by a circular-shaped partition $e$, inclosed in the box $a$ or firmly connected to the same, which is provided with a hole $f$ to receive the lower end of a spindle $g$, having a handle $h$ fixed transversely at the top. The spindle by its circular-shaped cross-section is free to rotate in the hole $f$ of the partition $e$ and in a corresponding hole in the cover $c$, and may also be moved longitudinally by hand. The part of the spindle which enters the hole $f$ is not made of a complete circular cross-section, but is so much flattened or reduced at $l$ and $l'$, Figs. 5 and 6, that the oil, meeting with great resistance, can flow drop by drop through the hole $f$, which is thus only partly filled by the end of the spindle when the chamber $p$, as in Fig. 1, is nearly air-tightly closed.

An orifice $d$, Figs. 1 and 2, is provided in the cover $c$ and is adapted to be closed by a stud $k$, which is connected firmly, by means of an arm $i$, with the spindle $g$. Washers $m$ and $n$ are placed between the cover and arm to prevent the entrance of air and dust. The arm $i$, together with the stud $k$ and washers $m$ and $n$, can all be lowered by pressing down the handle or grip $h$ of the spindle $g$ against the pressure of a spring $o$, as shown in Fig. 2, until the spindle can be turned to bring the stud $k$ out of its original position, Figs. 1 and 3, into position shown in Fig. 4, whereby the orifice $d$ is so completely opened that the filling of the chamber $p$ with oil may go on without interruption. While this is going on the hole $f$ in the partition $e$ need not be entirely closed; but it is preferable to cause it to be filled or stopped by the complete circular cross-section of the spindle $g$ in order that no unnecessary larger amount of oil discharge may take place. The chamber $p$ is now filled with oil, except that about one-sixth is left free for air, and on the parts being returned to the position shown in Fig. 1 the consequent expansion after the orifice $d$ has been closed will assist in the discharge of the oil toward the lubricating-chamber. After the filling-orifice $d$ has been closed the spring $o$ prevents any ingress of air and dust by pressing the washers $m$ and $n$ against the cover $c$.

The new lubricator can be made in any size, and when made of small size is suitable for cycles and the like.

Having now particularly described and ascertained the nature of my said invention and in what manner the same is to be performed, I declare that what I claim is—

A lubricator capable of being closed to render it dust-tight, characterized by a longitudinally and revolubly movable spindle $g$ being arranged therein under spring-pressure, which spindle carries at its upper end a stud $k$ for closing the filling-orifice $d$ and has its lower end adapted to close the lubricating-hole $f$ in such a manner, that, after the filling-orifice has been closed, the oil can only flow drop by drop through the lubricating-hole, substantially as hereinbefore described.

In witness whereof I have hereunto set my hand in presence of two witnesses.

ADALBERT KOSCHADE.

Witnesses:
 HARRY BELMONT,
 E. HARTL.